Nov. 13, 1928.
L. L. NETTLETON
1,691,206
ELECTRICAL APPARATUS
Filed Sept. 14, 1926
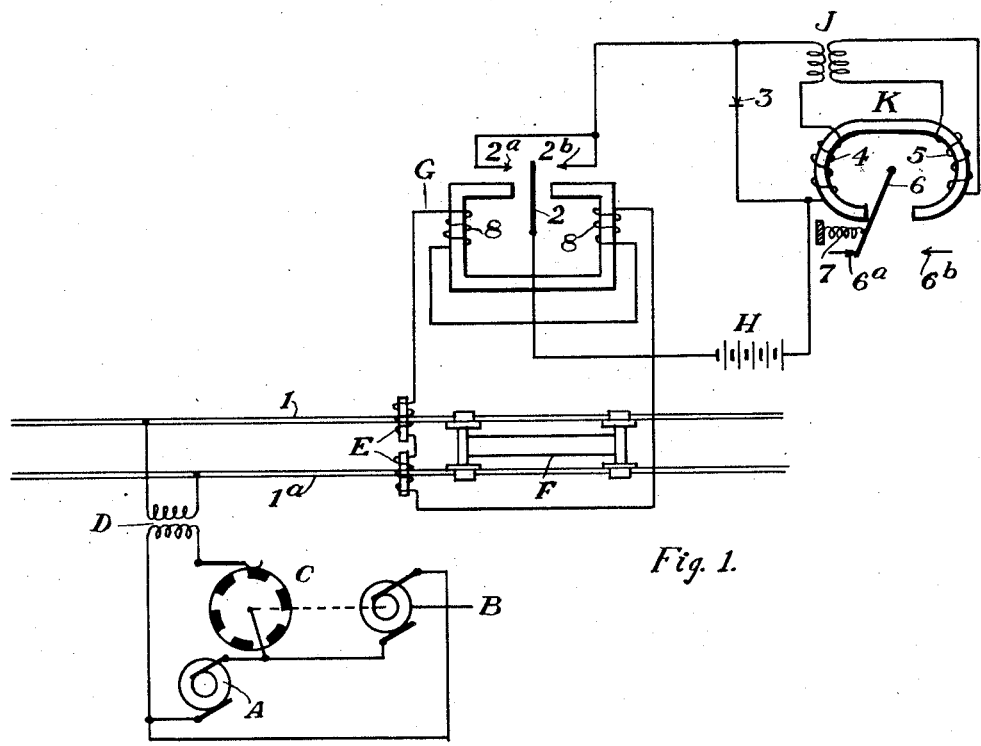
Fig. 1.
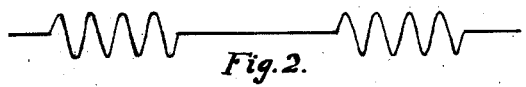
Current in Winding of G
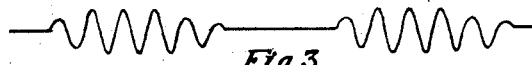
Amplitude of Armature 2.
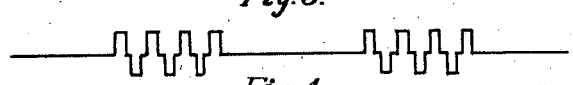
Closed to Right. Vibration
Neutral        Relay Contacts
Closed to Left.  2-2ᵃ and 2-2ᵇ
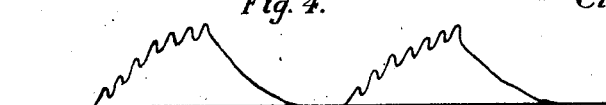
Primary Current in J
Current in 4
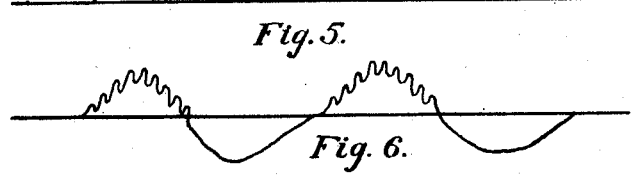
Secondary Current in J
Current in 5
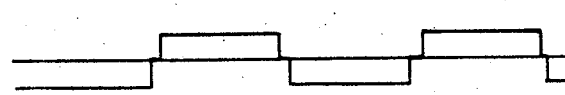
6-6ᵇ Closed
6-6ᵃ Closed
Contacts of
Relay K
INVENTOR:
L. L. Nettleton
by A. R. Vencill
His attorney Patented Nov. 13, 1928.

1,691,206

UNITED STATES PATENT OFFICE.

LEWIS L. NETTLETON, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRICAL APPARATUS.

Application filed September 14, 1926. Serial No. 135,356.

My invention relates to electrical apparatus, and particularly to apparatus of the type responsive to periodically interrupted alternating current.

I will describe one form of apparatus embodying my invention, and will then point out the novel features thereof in claims.

In the accompanying drawing, Fig. 1 is a diagrammatic view showing one form of apparatus embodying my invention, and Figs. 2 to 7, are curves which illustrate the operation of the apparatus shown in Fig. 1.

Referring first to Fig. 1, the reference character G designates a vibration relay having a winding 8 which is at times supplied with periodically interrupted alternating current, and a polarized armature 2 which is preferably tuned mechanically to vibrate at the frequency of the alternating current which is periodically supplied to the winding 8. As here shown, the winding 8 is supplied with current from a receiving device E mounted on the forward end of a railway train F travelling on track rails 1 and 1ª, and the receiving device E is in inductive relation with the track rails. Alternating current is supplied to the rails 1 and 1ª by a transformer D, the secondary of which is connected across the rails, and the primary of which is connected with a generator A through an interrupter C, which in turn is driven by a motor B energized from the generator A.

The vibration relay G comprises two contacts 2—2ª and 2—2ᵇ, which contacts are closed at opposite ends respectively of the stroke of the vibrating armature 2. These contacts are included in multiple in a circuit which also includes a battery H, the primary winding of a transformer J and a winding 4 of a polarized relay K. The secondary winding of transformer J supplies current to a second winding 5 on polarized relay K. Relay K has a polarized armature 6 co-acting with two contacts 6ª—6ᵇ, and is biased to a normal position in engagement with contact 6ª by a spring 7. An asymmetric unit 3 is connected across the primary of transformer J and the winding 4 of relay K in such direction as to freely conduct the current due to the self-induction of these windings.

The operation of the apparatus is as follows: When relay G is vibrated due to a train of alternating current waves from generator A, pulsating current will flow in the circuit of battery H, the frequency of such pulsations being twice the frequency of the current supplied by generator A, and this pulsating current will be impressed across the asymmetric unit 3. The first time that a contact of relay G is closed, current will flow from battery H, through contact 2—2ª or 2—2ᵇ, primary of transformer J and winding 4 to battery H. When the armature 2 of relay G returns to its middle position, current will continue to flow in the primary of transformer J and winding 4 through asymmetric unit 3, this current being due to the self-induction of the two windings. Thus the asymmetric unit 3 tends to smooth out the current fluctuations in the primary winding of transformer J and the winding 4, which fluctuations are at twice the frequency of the current delivered by generator A. The asymmetric unit 3 also prevents sparking at the contacts of relay G. When relay G stops vibrating, due to the interruption of the alternating current, no energy is supplied from battery H to transformer J and winding 4, and so the current in these elements dies down through the asymmetric unit 3 at a rate determined by the time constant of the circuit including these elements. It follows that for each train of alternating current waves and each period of interruption of these waves, current is built up and dies down once in the circuit including the primary winding of transformer J and the winding 4 of relay K. This induces an alternating current in the secondary of transformer J and winding 5 of relay K, which current is the same frequency as the frequency of interruption of the alternating current from generator A by the interrupter C. The direction of the current in winding 4 of relay K is such as to deflect armature 6 to the right into engagement with contact member 6ᵇ. The magnetic flux produced by winding 5 assists the flux produced by winding 4 when the latter flux is increasing, and opposes the flux produced by winding 4 when the latter flux is decreasing. This results in a comparatively square wave, that is, a wave having relatively steep sides, and this wave makes the motion of armature 6 more positive and quicker than if winding 4 were used alone.

The operation of the apparatus will be somewhat better understood from the curves shown in Figs. 2 to 7, inclusive. Fig. 2 illustrates the current in the winding 8 of relay G, which current it will be noted is periodically interrupted alternating current. Fig. 3 illustrates the motion of armature 2 of relay G, which motion, of course, follows the waves of the alternating current supplied to the winding of this relay. Fig. 4 illustrates the operation of the contacts 2—2$^a$ and 2—2$^b$ of relay G, from which it will be noted that during each train of waves these contacts are alternately closed at the same frequency as that of the current supplied to relay G. Fig. 5 shows the wave form of the current in the primary winding of transformer J and winding 4 of relay K, and it will be noted that this current builds up during the time that relay G is energized and dies away during the time relay G is de-energized, so that the frequency of the current supplied to these windings is the same as the frequency of interruptions of the alternating current supplied to relay G. Fig. 6 illustrates the current in the secondary of transformer J and winding 5, it being noted that this current has the same frequency as that supplied to the primary winding of transformer J and winding 4, but that the two currents are displaced in phase due to the action of transformer J. Fig. 7 illustrates the operation of contacts 6—6$^a$ and 6—6$^b$ of relay K. The resultant of the two waves shown in Figs. 5 and 6 is a wave having relative steep sides, that is, a wave having an abrupt increase to maximum value and an abrupt decrease to minimum value, and this wave causes relatively quick and positive action of relay K as hereinbefore stated.

Relay K may be utilized to control any suitable apparatus, such, for example, as train governing mechanism, it being understood that in actual practice the supply of periodically interrupted current to the track rails 1 and 1$^a$ will be governed by traffic conditions in advance.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a vibration relay supplied at times with periodically interrupted alternating current and tuned to the frequency of such alternating current, a circuit controlled by said relay and including a source of current and the primary winding of a transformer, and a second relay having two windings one of which is included in said circuit and the other of which is connected with the secondary of said transformer.

2. In combination, a vibration relay supplied at times with periodically interrupted alternating current and tuned to the frequency of such alternating current, a circuit controlled by said relay and including a source of current and the primary winding of a transformer, a second relay having two windings one of which is included in said circuit and the other of which is connected with the secondary of said transformer, and an asymmetric unit connected across the primary winding of said transformer and the first winding of said second relay in such direction as to conduct the current due to the self-induction of such windings.

3. In combination, a vibration relay supplied at times with periodically interrupted alternating current and tuned to the frequency of such alternating current, said relay having two contacts closed respectively at each end of the stroke of the vibrating member, a circuit including said two contacts in multiple as well as a source of current and the primary winding of a transformer, and a second relay having two windings one of which is included in said circuit and the other of which is connected with the secondary of said transformer.

4. In combination, a vibration relay supplied at times with periodically interrupted alternating current and tuned to the frequency of such alternating current, said relay having two contacts closed respectively at each end of the stroke of the vibrating member, a circuit including said two contacts in multiple as well as a source of current and the primary winding of a transformer, a second relay having two windings one of which is included in said circuit and the other of which is connected with the secondary of said transformer, and an asymmetric unit connected across the primary winding of said transformer and the first winding of said second relay in such direction as to conduct the current due to the self-induction of such windings.

In testimony whereof I affix my signature.

LEWIS L. NETTLETON.